July 17, 1951
C. A. ABRAMOWSKI
2,560,622
GUIDE WHEEL FOR TRAWL NETS
Original Filed Aug. 12, 1947
2 Sheets-Sheet 2
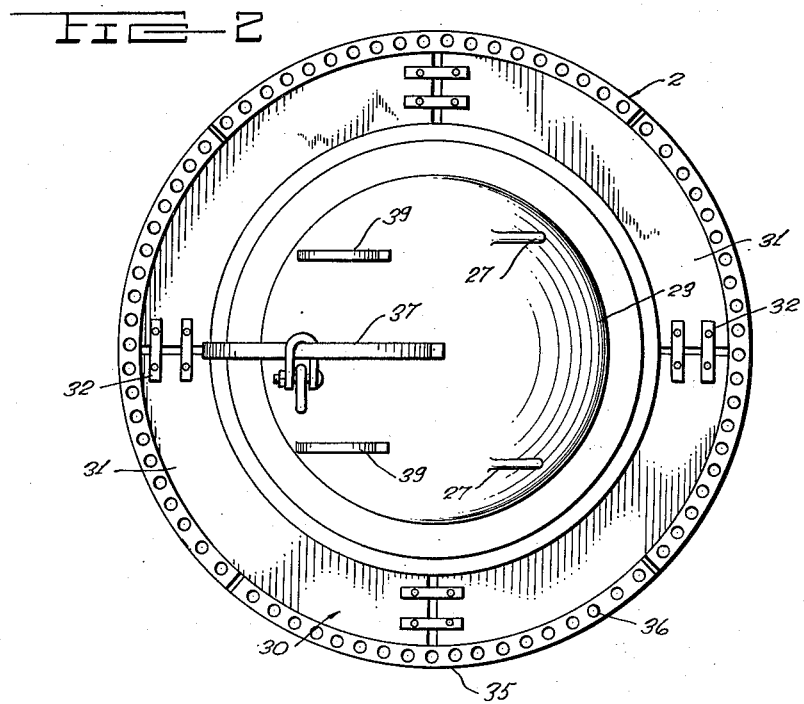
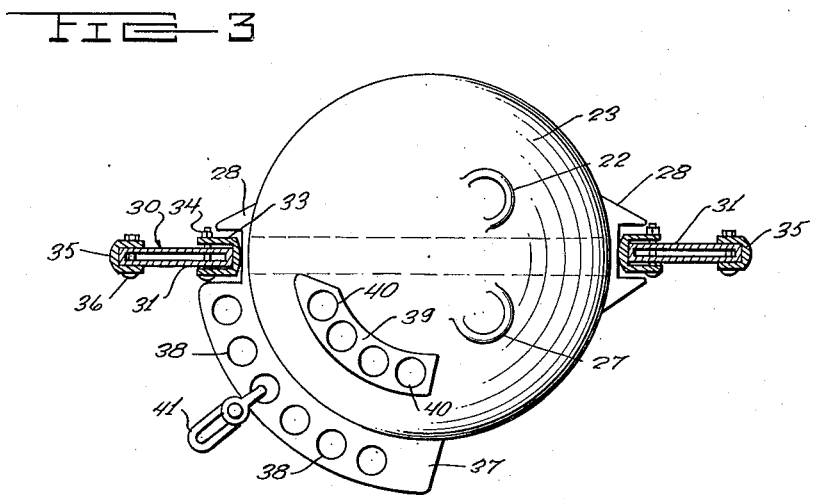
INVENTOR
CZESLAW A. ABRAMOWSKI
BY
McMorrow, Berman & Davidson
ATTORNEYS Patented July 17, 1951

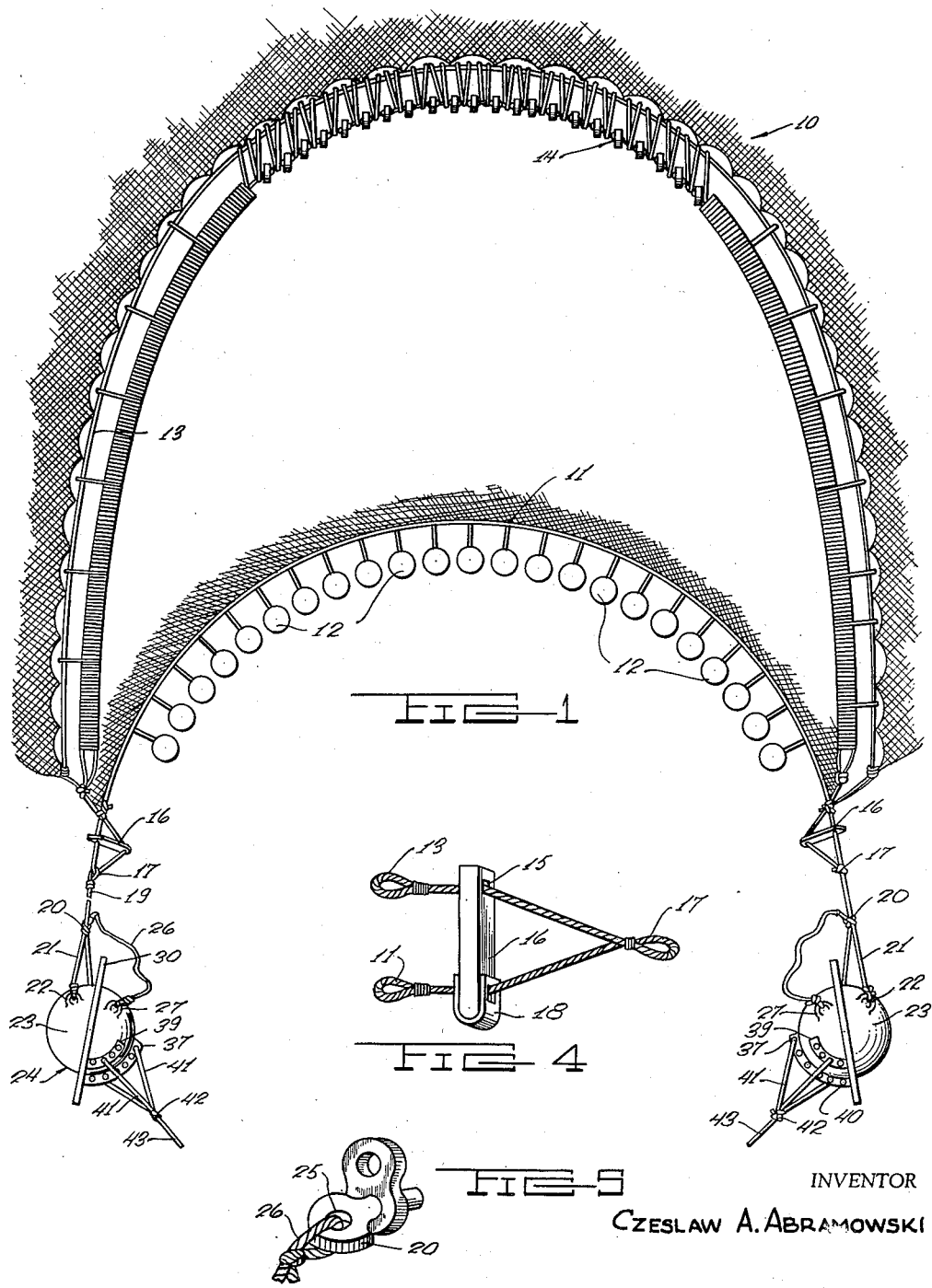

2,560,622

UNITED STATES PATENT OFFICE 2,560,622

GUIDE WHEEL FOR TRAWL NETS

Czeslaw A. Abramowski, Astoria, N. Y.

Original application August 12, 1947, Serial No. 768,193. Divided and this application December 9, 1949, Serial No. 132,115

3 Claims. (Cl. 43—9)

This application which is a division of my application Serial No. 768,193, filed August 12, 1947, and which is now abandoned, has to do with an invention relating to a guide wheel for trawl nets.

An object of the invention is the provision of a guide wheel for a trawl net which serves to effectively spread the mouth of the net to the required degree in response to the speed of the towing vessel.

Another object of the invention is the provision of a guide wheel for a trawl net which serves to effectively spread the mouth of the net to the required degree in response to the speed of the towing vessel, and without becoming embedded in the sea bottom.

A further object of the invention is the provision of a guide wheel for a trawl net which is substantially self-aligning in accordance with the direction of the tow, and which is adapted readily to ride over obstacles encountered on the sea bottom.

In the drawings:

Figure 1 is a top plan view of one form of net embodying features of the instant invention, parts thereof being broken away, shown in towing or trolling position.

Figure 2 is a side elevational view of one of the rotary discs or guide wheels comprising a feature of the instant invention.

Figure 3 is a top plan view of the construction shown in Figure 2, parts thereof being broken away.

Figure 4 is a perspective view of a constructional detail.

Figure 5 is a perspective view of a further constructional detail.

Similar reference characters refer to similar parts throughout the several views of the drawings.

Referring now to the drawings in detail, there is generally indicated at 10 a drag net, provided with a forward opening and head line 11 provided with a plurality of floats 12 comprising the top of the line. The net is also provided with a conventional ground line 13, upon which are mounted a plurality of rollers generally indicated at 14, and to be more fully described hereinafter, which are adapted to assist the passage of the ground line over the sea bottom.

The ground line 13 extends through one eye 15 of a stay 16 to a loop 17 (see Figure 4). The head line 11 extends through the other eye of the stay, which is provided with a metal boot 18, and terminates in the loop 17.

A bridle 19 leads from each loop 17 to a cat's eye 20, from which back straps 21 lead to eyes 22 on a spherical member 23 comprising a portion of the guide wheel, generally indicated at 24. From an aperture 25 of cat's eye 20, a pennant 26 leads to an eye 27, also secured to the sphere 23.

Referring now to the guide wheel in detail, as best shown in Figures 2 and 3, it will be seen that the sphere 23 is provided with a pair of spaced flanges 28 forming a track about the circumference of the sphere, which track is provided with a rotatably mounted disc 30, comprised of a plurality of quadrants 31, secured in related assembly, as by tie strips 32, suitably riveted or bolted to adjacent quadrants. The interior of each of quadrant 31 is provided with a metal shoe 33 suitably bolted, as by bolt 34 to the sides thereof, each quadrant 31 being further provided on its peripheral rim with a track 35 of generally channel-shaped configuration, and secured in related assembly, as by a bolt or rivet 36.

It will now be seen that when the guide wheel is towed in a manner to be more fully described hereinafter, the wheel or disc 30 is free to rotate about the sphere 23. The inner side of the sphere 23, it being noted that one sphere is adapted to be positioned on either side of the mouth of the net, is provided with an arcuate or sector band 37, having a plurality of apertures 38 therein positioned centrally of the sphere, at substantially right angles to the disc 30. Additional arcuate or sector bands 39 which parallel the band 37 are also provided on opposite sides thereof in the vertical plane of the disc 30, and also provided with apertures 40.

Fore straps 41 are adapted to be positioned selectively in apertures 38 and 40 and secured therein in any desired conventional manner, the apertures selected being determined by the speed of the towing craft. Under certain conditions, as when trolling in shallow water, the fore straps are adapted to be attached to all three of straps or bands 37 and 39, while under other conditions, as when trolling in deep water, a connection to the central strap 37 alone is necessary.

The fore straps 41 extend to suitable clips 42, from which warp lines 43 extend to the towing vessel.

I claim:

1. A guide wheel for a trawl net comprising a sphere, a track circumposed about said sphere and fixedly secured to the latter, a disc rotatably mounted in said track, means on said sphere for attachment thereto of an end of each of a ground and a head line of the net, and means on said sphere and spaced from said first named means for attachment thereto of an end of a warp line of a towing vessel, said last named means embodying a plurality of sector bands arranged in spaced relation with respect to each other and fixedly secured to the periphery of said sphere on one side of said track, each of said bands being provided with means for attachment thereto of fore straps carried by said end of the warp line.

2. A guide wheel for a trawl net comprising a sphere, a track circumposed about said sphere and fixedly secured to the latter, a disc rotatably mounted in said track, means on said sphere for attachment thereto of an end of each of a ground and head line of the net, and means on said sphere and spaced from said first named means for attachment thereto of an end of a warp line extending from a towing vessel, said last named means embodying a plurality of sector bands arranged in spaced relation with respect to each other and fixedly secured to the periphery of said sphere on one side of said track, each of said bands being provided with a plurality of apertures arranged in spaced relation therealong, the apertures in the respective bands selectively receiving for attachment fore straps carried by said end of the warp line.

3. A guide wheel for a trawl net comprising a sphere, a track circumposed about said sphere and fixedly secured to the latter, a disc rotatably mounted in said track, said disc embodying a plurality of quadrants arranged in end to end relation and secured together at their meeting ends, means on said sphere for attachment thereto of an end of each of a ground and a head line of the net, and means on said sphere and spaced from said first named means for attachment thereto of an end of a warp line extending from a towing vessel, said last named means embodying a plurality of sector bands arranged in spaced relation with respect to each other and fixedly secured to the periphery of said sphere on one side of said track, each of said bands being provided with a plurality of apertures arranged in spaced relation therealong, the apertures in the respective bands selectively receiving for attachment fore straps carried by said end of the warp line.

CZESLAW A. ABRAMOWSKI.

REFERENCES CITED

The following references are of record in the file of this patent:

UNITED STATES PATENTS

| Number | Name | Date |
| --- | --- | --- |
| 611,931 | Pearson | Oct. 4, 1898 |
| 1,845,102 | Tibbetts | Feb. 16, 1932 |
| 2,062,718 | Kallberg | Dec. 1, 1936 |

FOREIGN PATENTS

| Number | Country | Date |
| --- | --- | --- |
| 150,079 | Great Britain | Aug. 30, 1920 |
| 537,726 | Great Britain | July 3, 1941 |